G. C. McNEIL.
BRAKE MECHANISM.
APPLICATION FILED JULY 29, 1912.
1,134,474.
Patented Apr. 6, 1915.
Fig. I.
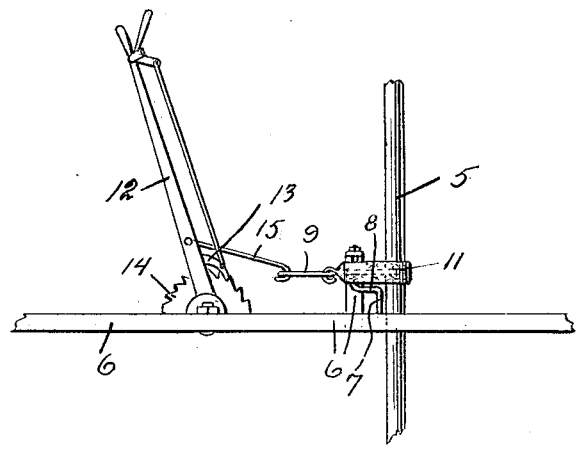
Fig. 2.
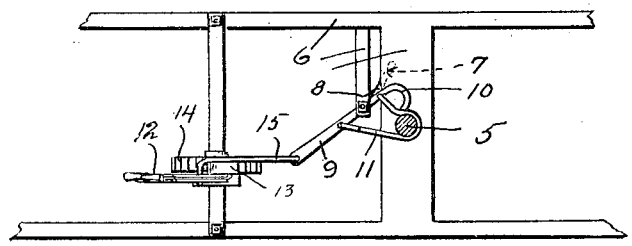

UNITED STATES PATENT OFFICE.

GEORGE C. McNEIL, OF ETHRIDGE, TENNESSEE, ASSIGNOR OF ONE-HALF TO E. C. MASSEY, OF ETHRIDGE, TENNESSEE.

BRAKE MECHANISM.

1,134,474. Specification of Letters Patent. Patented Apr. 6, 1915.

Application filed July 29, 1912. Serial No. 712,168.

*To all whom it may concern:*

Be it known that I, GEORGE C. MCNEIL, a citizen of the United States, residing at Ethridge, in the county of Lawrence, State of Tennessee, have invented certain new and useful Improvements in Brake Mechanism; and I do hereby declare the following to be a full, clear, and exact description of the invention, such as will enable others skilled in the art to which it appertains to make and use the same.

This invention relates to brake mechanisms and has for its object the provision of a novel brake mechanism particularly adapted for controlling and stopping the movement of a shaft.

With the above and other objects in view, such as simplicity, efficiency, durability in service and the general improvement of the art, my invention consists in the novel construction and arrangement of parts as will be hereinafter more fully described and claimed, and illustrated in the accompanying drawings, in which—

Figure 1 is a side elevation of my brake mechanism applied to a driven shaft and Fig. 2 is a top plan view thereof.

Referring more particularly to the drawings, the numeral 5 designates a driven shaft which may be a part of any form of device, as it forms no part of the present invention. My invention consists in the provision of means for controlling the speed of rotation of said shaft, and comprises parts to be described which may be mounted upon any suitable frame 6, such as shown, disposed adjacent the shaft 5.

A vertically disposed crank shaft 7 has its ends journaled through the frame 6 and includes a horizontally swinging crank 8 upon which is pivoted intermediate its ends a brake lever 9, having its forward end 10 curved inwardly toward the shaft 5. A brake strap 11 is trained around the shaft 5 and has its ends connected to the lever 9 on opposite sides of its point of connection with the crank 8. A hand lever 12 is fulcrumed upon the frame and carries a pawl 13 adapted for engagement with the teeth of a ratchet 14. The hand lever 12 is connected with the end of the brake lever 9 opposite the curved end 10 thereof by means of a link 15.

From the foregoing description and a study of the drawings, it will be observed that when the hand lever 12 is pulled backwardly away from the shaft 5, the link 15 will cause the brake lever 9 to swing horizontally so as to urge the curved end 10 thereof inwardly against the strap 11 and thereby tension the strap 11 on the shaft 5. Sufficient force may be exerted upon this strap to quickly stop the rotation of the shaft.

The provision of the ratchet and pawl associated with the hand lever 12 enables the operator to apply a certain degree of tension upon the strap 11 and maintain such desired tension for diminishing the speed of the shaft 5 without entirely stopping the shaft.

It will thus be seen that I have provided a brake mechanism for driven shafts which is simple, efficient and positive in operation and which comprises a minimum number of parts.

What is claimed is:

1. In combination with a driven shaft, means for stopping the rotation of said shaft including a manually operable brake lever, a strap embracing said shaft and connected at both ends to said lever, a curved terminal portion formed on said lever and means for rocking said lever whereby to impinge said terminal portion against said strap with a resultant frictional engagement of said strap with said shaft sufficient to stop rotation of said shaft.

2. In combination with a driven shaft, a brake mechanism comprising a brake lever having one end reflexly bent, said lever being pivoted intermediate its ends adjacent said driven shaft, a strap trained about said shaft and having its ends connected with said lever upon opposite sides of said pivot point and manual means for rocking said lever to engage said reflexly bent portion against said strap with a resultant frictional engagement of said strap with said shaft.

3. In combination with a driven shaft, a brake mechanism comprising a lever pivoted intermediate its ends adjacent said shaft and adapted to swing at right angles to said shaft, a laterally curved portion formed on one end of said lever, a strap trained about said shaft and having its ends connected with said lever on opposite sides of said pivot point, a pivoted hand lever and a link connecting said hand lever with said brake lever for swinging said brake lever to force said laterally curved portion against said strap.

In testimony whereof, I affix my signature, in presence of two witnesses.

GEORGE C. McNEIL.

Witnesses:
S. A. WILKINSON,
S. L. LUTTS.